US009946956B2

(12) United States Patent
Chauhan et al.

(10) Patent No.: US 9,946,956 B2
(45) Date of Patent: Apr. 17, 2018

(54) DIFFERENTIAL IMAGE PROCESSING

(71) Applicant: QUALCOMM Incorporated, San Diego, CA (US)

(72) Inventors: Siddharth Chauhan, San Diego, CA (US); Nishant Pandit, San Diego, CA (US); Hau Ling Hung, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/183,720

(22) Filed: Jun. 15, 2016

(65) Prior Publication Data

US 2017/0364772 A1    Dec. 21, 2017

(51) Int. Cl.
| | |
|---|---|
| *G06K 9/68* | (2006.01) |
| *G06K 9/62* | (2006.01) |
| *G06T 3/40* | (2006.01) |
| *G06T 7/00* | (2017.01) |
| *G06T 7/20* | (2017.01) |
| *G06T 1/00* | (2006.01) |

(Continued)

(52) U.S. Cl.
CPC ......... *G06K 9/6215* (2013.01); *G06K 9/6212* (2013.01); *G06T 1/00* (2013.01); *G06T 3/40* (2013.01); *G06T 7/0081* (2013.01); *G06T 7/20* (2013.01); *H04N 5/232* (2013.01); *H04N 19/176* (2014.11); *G06T 2207/10016* (2013.01); *G06T 2207/20012* (2013.01); *G06T 2207/20021* (2013.01)

(58) Field of Classification Search
None
See application file for complete search history.

(56) References Cited

U.S. PATENT DOCUMENTS

| | | | | |
|---|---|---|---|---|
| 8,023,750 | B2 * | 9/2011 | Raveendran | H04N 19/176 382/232 |
| 8,428,372 | B2 * | 4/2013 | Meany | H03M 7/30 382/232 |

(Continued)

OTHER PUBLICATIONS

Metkar et al, Performance Evaluation of Block Matching Algorithms for Video Coding, Motion Estimation Techniques for Digital Video Coding, SpringerBriefs in Computational Intelligence, 2013.*

(Continued)

*Primary Examiner* — Andrae S Allison
(74) *Attorney, Agent, or Firm* — Knobbe, Martens, Olson & Bear, LLP

(57) ABSTRACT

An image signal processor (ISP) processes received image frame data. In order to reduce power consumption caused by the processing of substantially similar image tiles of received image frames, differential processing may be used to determine which image tiles of a received image frame should be processed by the ISP, based upon a comparison between the received image tiles and previously received image tile data. In addition, differential processing may be automatically disabled in response to a determination that the image frames are too different from each other to realize any savings in processing resources or memory usage, and reenabled in response to a determination the received image frames are similar enough such that power savings can be realized through differential processing.

20 Claims, 12 Drawing Sheets

(51) Int. Cl.
*H04N 5/232* (2006.01)
*H04N 19/176* (2014.01)

(56) References Cited

U.S. PATENT DOCUMENTS

| | | | | |
|---|---|---|---|---|
| 9,734,597 | B2* | 8/2017 | Akenine-Moller | G06T 9/00 |
| 2004/0233990 | A1* | 11/2004 | Sekiguchi | H04N 19/105 |
| | | | | 375/240.16 |
| 2006/0010392 | A1* | 1/2006 | Noel | G06F 3/0481 |
| | | | | 715/759 |
| 2006/0251330 | A1* | 11/2006 | Toth | H04N 19/52 |
| | | | | 382/236 |
| 2008/0100721 | A1 | 5/2008 | Ayaki | |
| 2008/0292216 | A1 | 11/2008 | Walker et al. | |
| 2012/0002890 | A1 | 1/2012 | Mathew | |
| 2012/0176386 | A1 | 7/2012 | Hutchins | |
| 2012/0311067 | A1* | 12/2012 | Fremantle | H04L 67/26 |
| | | | | 709/213 |
| 2014/0210973 | A1* | 7/2014 | Takahashi | A61B 1/04 |
| | | | | 348/65 |
| 2015/0317519 | A1 | 11/2015 | Gurbuz | |
| 2016/0021384 | A1 | 1/2016 | Croxford et al. | |
| 2016/0042491 | A1 | 2/2016 | Croxford et al. | |
| 2017/0178362 | A1* | 6/2017 | Akenine-Moller | G06T 9/00 |

OTHER PUBLICATIONS

Rath et al, Subblock Matching-Based Conditional Motion Estimation With Automatic Threshold Selection for Video Compression, 914 IEEE Transactions on Circuits and Systems for Video Technology, vol. 13, No. 9, Sep. 2003.*
International Search Report and Written Opinion—PCT/US2017/029343—ISA/EPO—dated Jul. 20, 2017.

* cited by examiner

DIFFERENTIAL IMAGE PROCESSING

FIELD

This disclosure generally relates to image processing, and more particularly to systems and methods for differential image processing.

BACKGROUND

Image signal processors (ISP) may be used for image processing in digital cameras, mobile phones, and other devices. ISPs typically process images on a per-frame or a per-line basis. For high resolution images, this may lead to high clock requirements and high power consumption.

In some cases, when a user wants to take a photograph, they may launch the camera and at some point of time, and click the shutter button to capture the intended scene. During the time between the user positioning the camera and actually capturing an image, numerous similar frames are being processed by the ISP, causing unnecessary power consumption.

SUMMARY

The systems, methods and devices of this disclosure each have several innovative aspects, no single one of which is solely responsible for the desirable attributes disclosed herein.

In some embodiments, a method operable by an image processing device is provided. The method comprises storing an indication of a first image frame in a buffer of the device, the first image frame corresponding to a previously received image frame, and receiving a second image frame, the second image frame comprising a plurality of image tiles. The method further comprises performing differential image detection (DID) via determining which tiles of the second image frame are to be processed by an image signal processor (ISP). Performing DID is based on identifying an indication of a corresponding first image tile of the first image frame corresponding to a second image tile of the second image frame, comparing the indication of the corresponding first image tile and the second image tile to determine a dissimilarity value between the corresponding first image tile and the second image tile, and, in response to a determination that the dissimilarity value between the corresponding first image tile and the second image tile meets a tile threshold, designating the second image tile as a delta tile to be processed by the ISP. The method further comprises, in response to a determination that a number of designated delta tiles associated with the second image frame has reached a frame threshold limit, not performing DID for a remainder of the image tiles of the second image frame, such that the remainder of the image tiles are all designated to be processed by the ISP.

In some embodiments, the method further comprises, in response to a determination that a number of received image frames meeting the frame threshold value meets a differential processing bypass threshold value, not performing DID such that all tiles of subsequent received image frames are designated to be processed by the ISP.

In some embodiments, the DID bypass threshold value indicates a number of consecutively received image frames meeting the frame threshold value.

In some embodiments, the method further comprises receiving one or more feedback statistics from the ISP, and re-enabling DID, based at least in part upon the one or more received feedback statistics from the ISP.

In some embodiments, the one or more feedback statistics comprise at least one or more motion statistics, wherein the one or more motion statistics are used to determine a similarity level between a processed image frame and a previously processed image frame.

In some embodiments, the method further comprises receiving one or more feedback statistics from one or more third-party sensors, and re-enabling DID, based at least in part upon the one or more received feedback statistics from the one or more third-party sensors.

In some embodiments, performing differential image detection further comprises downscaling the second image frame.

In some embodiments, the method further comprises updating the buffer using the designated delta tiles.

In some embodiments, the frame threshold value is based at least in part upon a number of image tiles of the second image frame. In some embodiments, the differential processing bypass threshold value indicates a number of consecutively received image frames meeting the frame threshold value.

In some embodiments, an image processing device is provided. The image processing device comprises a buffer storing an indication of a first image frame in a buffer of the device, the first image frame corresponding to a previously received image frame. The image processing device further comprises a processor. The processor is configured to receive a second image frame, the second image frame comprising a plurality of image tiles, perform differential image detection (DID) via determining which tiles of the second image frame are to be processed by an image signal processor (ISP), based on: identifying an indication of a corresponding first image tile of the first image frame corresponding to a second image tile of the second image frame, comparing the indication of the corresponding first image tile and the second image tile to determine a dissimilarity value between the corresponding first image tile and the second image tile, and, in response to a determination that the dissimilarity value between the corresponding first image tile and the second image tile meets a tile threshold, designating the second image tile as a delta tile to be processed by the ISP. The processor is further configured to, in response to a determination that a number of designated delta tiles associated with the second image frame has reached a frame threshold limit, not performing DID for a remainder of the image tiles of the second image frame, such that the remainder of the image tiles are all designated to be processed by the ISP.

In some embodiments, the processor is further configured to, in response to a determination that a number of received image frames meeting the frame threshold value meets a differential processing bypass threshold value, not perform DID such that all tiles of subsequent received image frames are designated to be processed by the ISP.

In some embodiments, the DID bypass threshold value indicates a number of consecutively received image frames meeting the frame threshold value.

In some embodiments, the processor is further configured to receive one or more feedback statistics from the ISP, and re-enable DID, based at least in part upon the one or more received feedback statistics from the ISP.

In some embodiments, the one or more feedback statistics comprise at least one or more motion statistics, wherein the one or more motion statistics are used to determine a similarity level between a processed image frame and a previously processed image frame.

In some embodiments, the processor is further configured to receive one or more feedback statistics from one or more third-party sensors, and re-enable DID, based at least in part upon the one or more received feedback statistics from the one or more third-party sensors.

In some embodiments, performing differential image detection further comprises downscaling the second image frame.

In some embodiments, the processor is further configured to update the buffer using the designated delta tiles.

In some embodiments, the frame threshold value is based at least in part upon a number of image tiles of the second image frame. In some embodiments, the differential processing bypass threshold value indicates a number of consecutively received image frames meeting the frame threshold value.

BRIEF DESCRIPTION OF THE DRAWINGS

Various features, nature and advantages may become apparent from the detailed description set forth below when taken in conjunction with the drawings in which like reference characters identify correspondingly throughout.

DETAILED DESCRIPTION

The following detailed description is directed to certain specific embodiments of the invention. However, the invention can be embodied in a multitude of different ways. It should be apparent that the aspects herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

Further, the systems and methods described herein may be implemented on a variety of different computing devices that host a camera. These include mobile phones, tablets, dedicated cameras, portable computers, photo booths or kiosks, personal digital assistants, ultra-mobile personal computers, mobile internet devices, security cameras, action cameras, drone cameras, automotive cameras, body cameras, head mounted cameras, etc. They may use general purpose or special purpose computing system environments or configurations. Examples of computing systems, environments, and/or configurations that may be suitable for use with the described technology include, but are not limited to, personal computers (PCs), server computers, hand-held or laptop devices, multiprocessor systems, microprocessor-based systems, programmable consumer electronics, network PCs, minicomputers, mainframe computers, distributed computing environments that include any of the above systems or devices, and the like.

Figure 1:
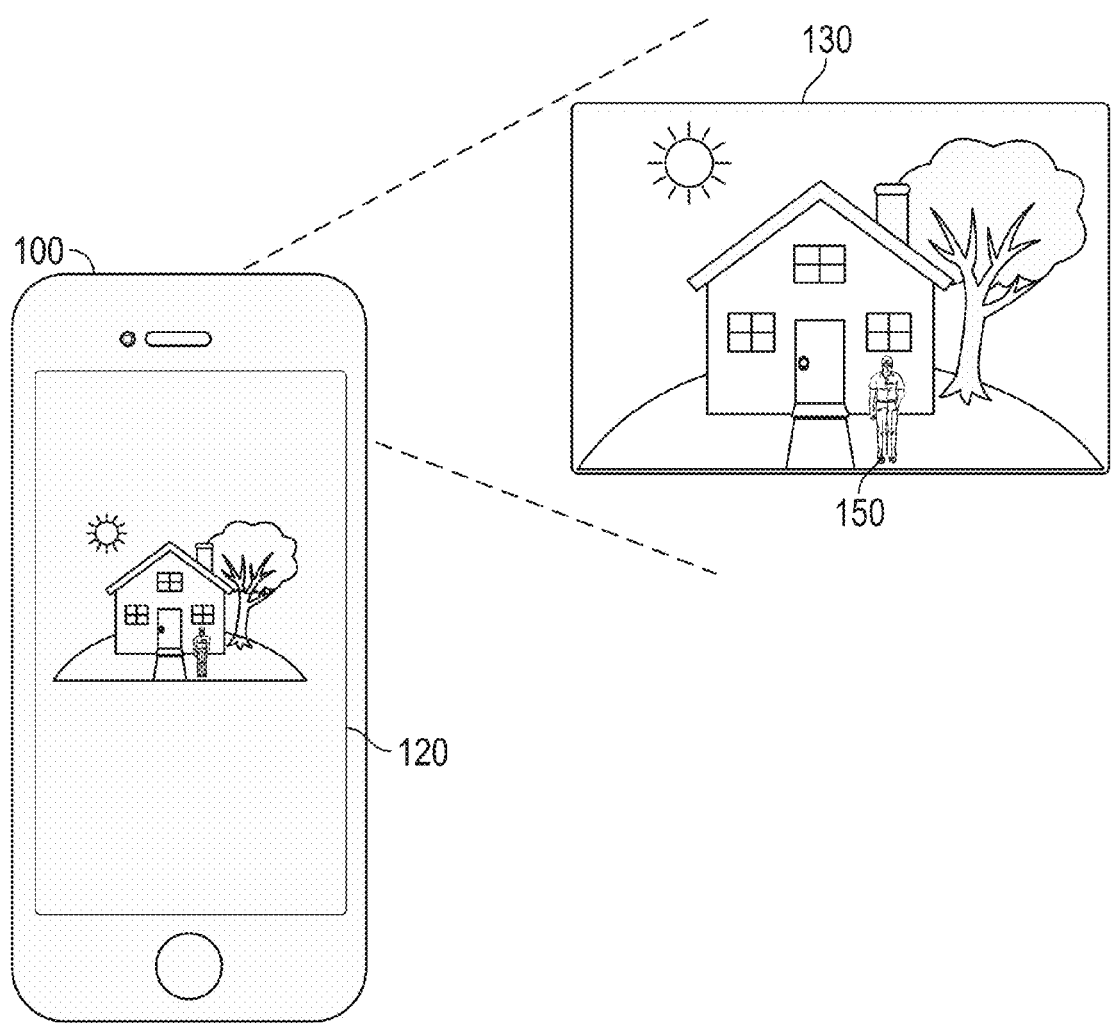
FIG. 1 illustrates an example of an apparatus (e.g., a mobile communication device) that includes an imaging system that can record images of a scene in accordance with aspects of this disclosure.

FIG. 1 illustrates an example of an apparatus (e.g., a mobile communication device) that includes an imaging system that can record images of a scene in accordance with aspects of this disclosure. The apparatus 100 includes a display 120. The apparatus 100 may also include a camera on the reverse side of the apparatus, which is not shown. The display 120 may display images captured within the field of view 130 of the camera. FIG. 1 shows an object 150 (e.g., a person) within the field of view 130 which may be captured by the camera. A processor within the apparatus 100 may perform various functions relating to the imaging device, which may include image capture functions (e.g., auto-focus), image processing functions (e.g., image processing by an ISP, differential image detection, and/or the like), etc.

Figure 2:
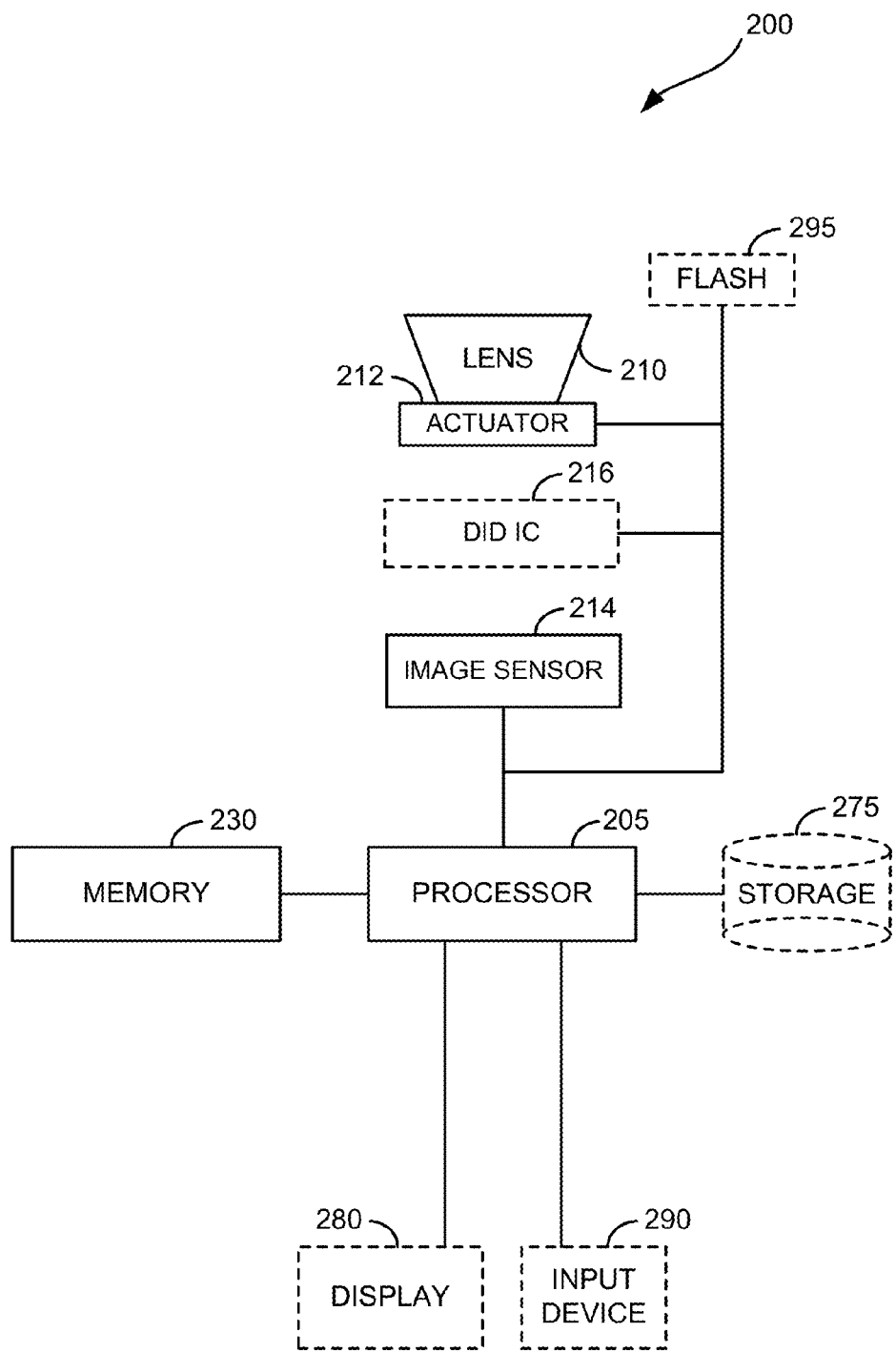
FIG. 2 is a block diagram illustrating an example of an imaging device in accordance with aspects of this disclosure.

FIG. 2 depicts a block diagram illustrating an example of an imaging device in accordance with aspects of this disclosure. The imaging device 200, also referred herein to interchangeably as a camera, may include a processor 205 operatively connected to an image sensor 214, an optional differential image detector (DID) integrated circuit (IC) 216, a lens 210, an actuator 212, a memory 230, an optional storage 275, an optional display 280, an optional input device 290, and an optional flash 295. In this example, the illustrated memory 230 may store instructions to configure processor 205 to perform functions relating to the imaging device 200. In this example, the memory 230 may include instructions for instructing the processor 205 to capture images, perform differential image detection on captured images, process and store portions of captured images, and/or the like.

In an illustrative embodiment, light enters the lens 210 and is focused on the image sensor 214. In some embodiments, the lens 210 is part of a system which can include multiple lenses and adjustable optical elements and may be controllable by the processor 205. In one aspect, the image sensor 214 utilizes a charge coupled device (CCD). In another aspect, the image sensor 214 utilizes either a complementary metal-oxide semiconductor (CMOS) or CCD sensor. The lens 210 is coupled to the actuator 212 and may be moved by the actuator 212 relative to the image sensor 214. The movement of the lens 210 with respect to the image sensor 214 may be used to focus captured image.

For example, the actuator 212 may be configured to move the lens 210 in a series of one or more lens movements to adjust the lens position to change the focus of an image.

The display 280 may be configured to display images captured via the lens 210 and the image sensor 214 and may also be utilized to implement configuration functions of the imaging device 200. In one implementation, the display 280 may be configured to display one or more regions of a captured image selected by a user, via an input device 290, of the imaging device 200. In some embodiments, the imaging device 200 may not include the display 280.

The input device 290 may take on many forms depending on the implementation. In some implementations, the input device 290 may be integrated with the display 280 so as to form a touch screen display. In other implementations, the input device 290 may include separate keys or buttons on the imaging device 200. These keys or buttons may provide input for navigation of a menu that is displayed on the display 280. In other implementations, the input device 290 may be an input port. For example, the input device 290 may provide for operative coupling of another device to the imaging device 200. The imaging device 200 may then receive input from an attached keyboard or mouse via the input device 290. In still other embodiments, the input device 290 may be remote from and communicate with the imaging device 200 over a communication network, e.g., a wireless network.

In some embodiments, the DID IC 216 may be used to perform differential processing on received images. As will be discussed below, differential processing may be used to reduce an amount of processing that needs to be performed on received image data, by only processing certain portions of received images. In some embodiments, differential processing may be performed by processor 205 instead of DID IC 216, or by a combination of DID IC 216 and processor 205.

The memory 230 may be utilized by the processor 205 to store data dynamically created during operation of the imaging device 200. In some instances, the memory 230 may include a separate working memory in which to store the dynamically created data. For example, instructions stored in the memory 230 may be stored in the working memory when executed by the processor 205. The working memory may also store dynamic run time data, such as stack or heap data utilized by programs executing on processor 205. The storage 275 may be utilized to store data created by the imaging device 200. For example, images captured via image sensor 214 may be stored on storage 275. Like the input device 290, the storage 275 may also be located remotely, i.e., not integral with the imaging device 200, and may receive captured images via the communication network.

The memory 230 may be considered a computer readable medium and stores instructions for instructing the processor 205 and/or DID IC 216 to perform various functions in accordance with this disclosure. For example, in some aspects, memory 230 may be configured to store instructions that cause the processor 205 and/or DID IC 216 to perform various methods, such as those as described below and as illustrated in FIGS. 8-11.

Imaging devices (e.g., digital cameras and other image or video capture devices) may be configured to capture a sequence of still images (hereinafter referred to as "image frames"), which may be processed by an ISP and stored in a memory. In some embodiments, the ISP processes incoming image data on a per-frame basis. In other embodiments, the ISP processes data on a per-line basis, wherein a line may correspond to a line of pixels on the frame (e.g., a horizontal line across the frame). In some embodiments, the ISP may process image data as it is received (e.g., by an image sensor 214). In other embodiments, the image sensor (e.g., image sensor 214) may store captured image data (e.g., in a memory or storage, such as storage 275), which may later be retrieved by the ISP for processing. For example, the ISP may periodically access the storage and process the captured un-processed image data contained therein.

Figure 3:
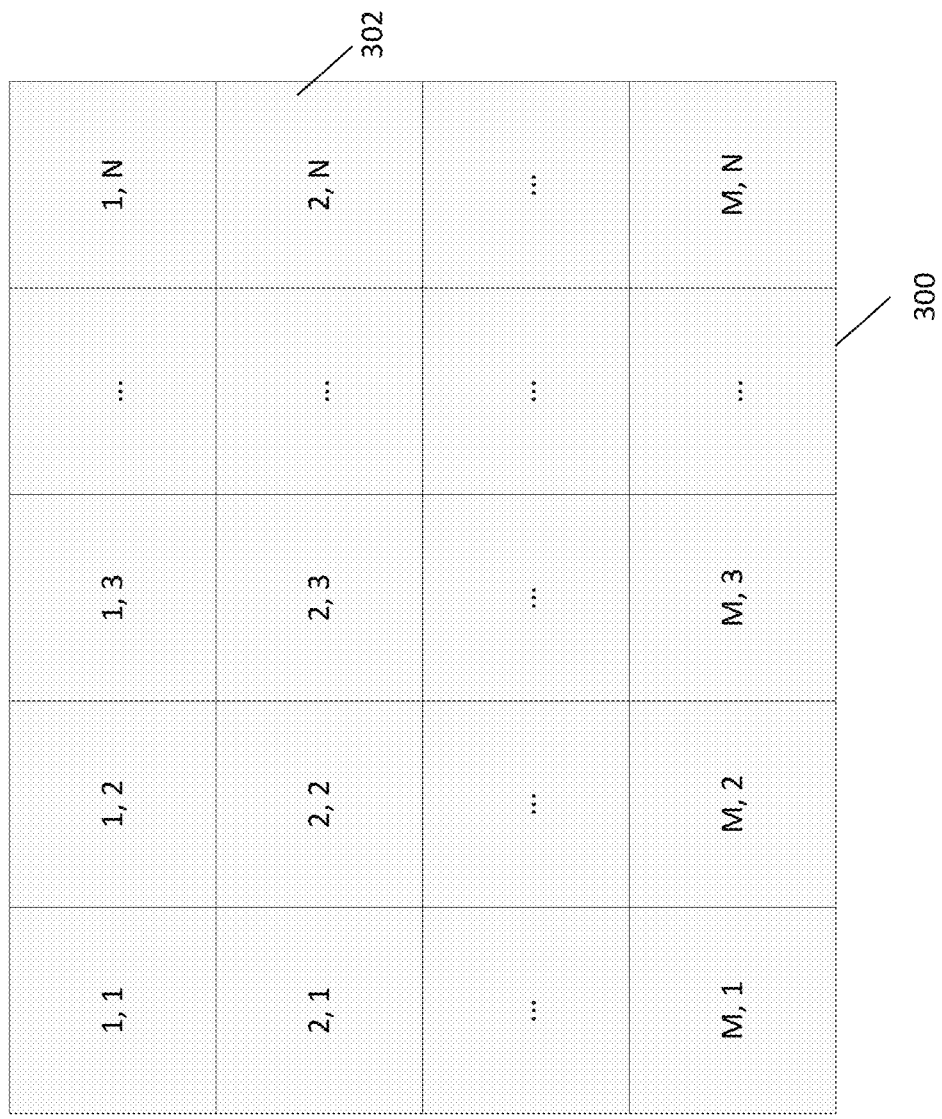
FIG. 3 illustrated an example image frame divided into a plurality of tiles.

In some embodiments, an image frame may be divided into a plurality of tiles, for example, as illustrated in FIG. 3. For example, image frame 300 may be divided into a grid of M by N tiles 302. Each tile may correspond to an array of one or more pixels. While the illustrated embodiment shows tiles 302 as being substantially square in shape, it is understood that in other embodiments, tiles may be configured to have different shapes. In addition, while the illustrated embodiment shows the tiles 302 as being uniform in size, in other embodiments, tiles in an image frame may have different sizes (e.g., tiles near the center of the frame may be smaller in size, while tiles near the edge of the frame may be larger). In some embodiments, the ISP is configured to process received image data on a per-tile basis. For each tile, the ISP may process the tile on a per-tile basis, a per-line basis, and/or the like.

Figure 4:
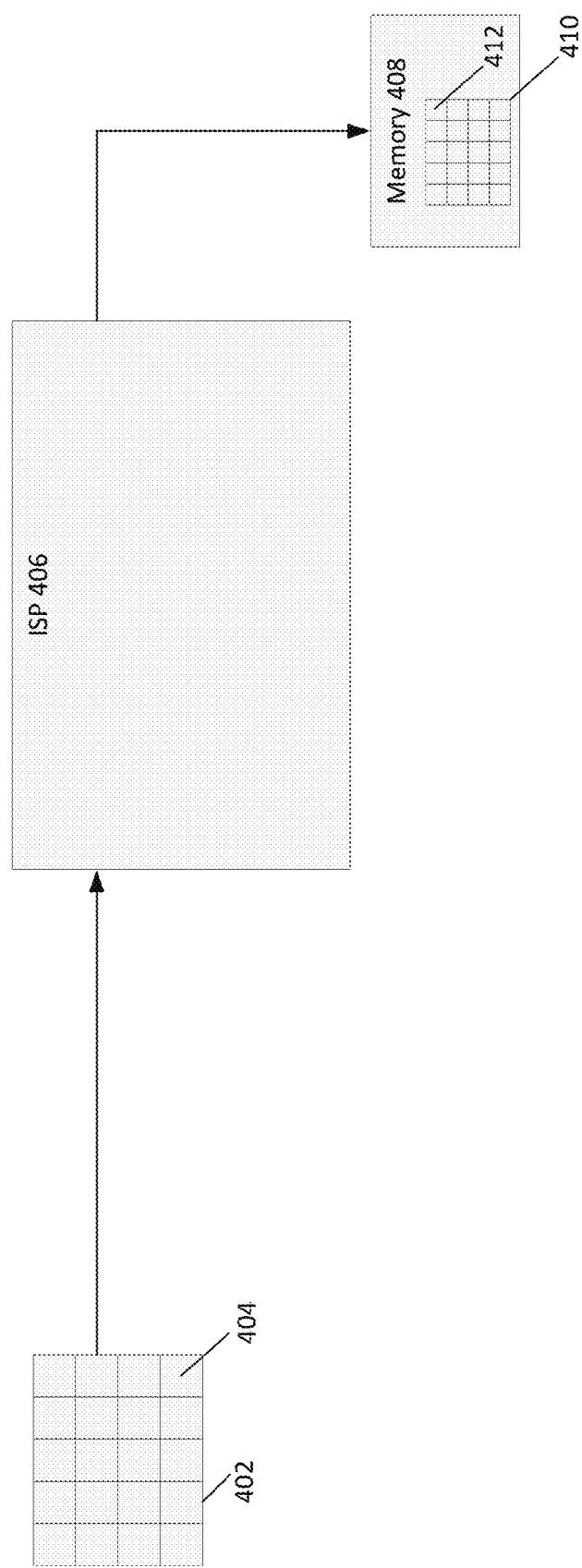
FIG. 4 illustrates a block diagram of an example image processing system.

FIG. 4 illustrates a block diagram of an image processing system, in accordance with some embodiments. Incoming image data comprising an image frame 402 divided into a plurality of tiles 404, each tile 404 corresponding to an array of one or more pixels within the image frame 402. The image frame 402 is received at an ISP 406 that processes the image frame 402 (e.g., on a per-tile basis) to produce a processed image data that may be then be stored in a memory 408 as a processed image frame 410. The processed image frame 410 is divided into a plurality of processed tiles 412 corresponding to the plurality of tiles 404 of image frame 402. In some embodiments, the ISP 406 may be implemented as part of the processor 205 as illustrated in FIG. 2, while the memory 408 may be implemented as part of the storage 275.

As illustrated in the system of FIG. 4, the ISP 406 processes each tile 404 of each incoming image frame 402 to be stored in memory 408. However, in some situations, in order to reduce power consumption and the amount of processing required, it may be desirable that the ISP 406 does not process each frame in its entirety. For example, in some embodiments, a differential image detector (DID) may be used to determine which tiles of each received image frame will be processed by the ISP. By reducing the number of tiles needed to be processed by the ISP, processing resources and power consumption can be reduced.

Figure 5:
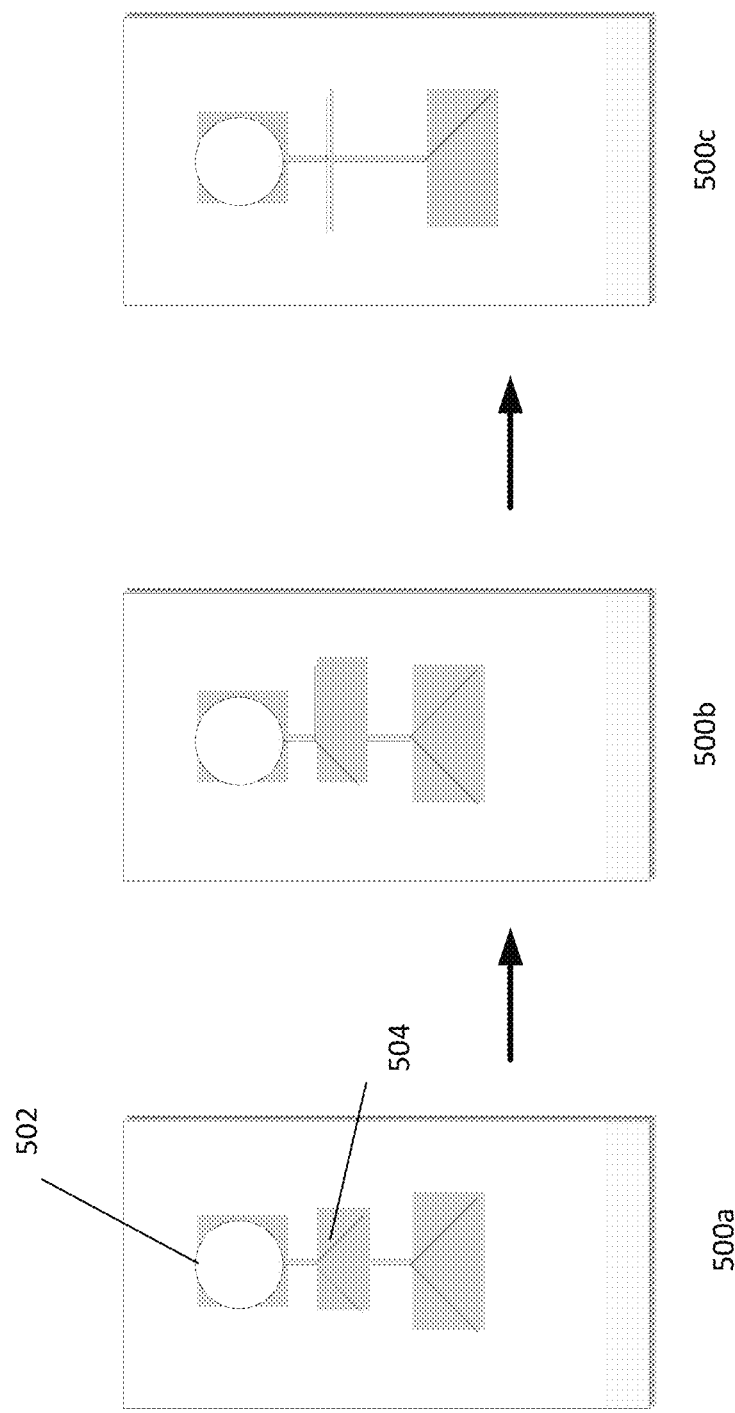
FIG. 5 illustrates a series of image frames that may be captured by a digital camera or other device to be processed by an ISP.

In some embodiments, received image frames may contain portions that are identical or similar to previously received image frames. For example, movement of objects depicted in the image frame may occur in certain regions of the frame, while other regions of the frame remain relatively constant. For example, FIG. 5 illustrates a series of image frames that may be captured by a digital camera or other device to be processed by an ISP. The image frames 500a, 500b, and 500c depict a person 502, wherein the person 502 moves his arms 504 between frames. As such, assuming similar lighting conditions between frames, the frames 500a, 500b, and 500c may contain regions that are different from each other between frames (e.g., regions around arms 504), as well as regions that are identical or substantially similar between frames (e.g., regions around the head, torso, or legs).

In some embodiments, an image capture device may have a high frame rate (e.g., 30, 60, or 90 frames per second). As such, even when a user wants to take a still photograph, during the time between the user positioning the camera and actually capturing an image, a large number of similar frames may be captured. In addition, certain techniques such as digital image stabilization (DIS) may be used to compensate for small movements of the user's hands holding the camera, potentially reducing an amount of variation between consecutively-captured frames.

The DID may be used to compare received image frame data with previously processed image frame data (e.g., using a comparator), in order to determine which portions of the frame should be processed by the ISP, and which portions do not need to be processed. For example, in some embodiments, tiles of the received image frame that are identical or substantially similar to corresponding tiles of the previously processed image frame may not need to be processed by the ISP, while tiles that are different from corresponding tiles of the previously processed image frame are processed by the ISP. In some embodiments, the tiles processed by the ISP may be combined with one or more previously processed tiles in order to construct a particular processed image frame.

Figure 6A:
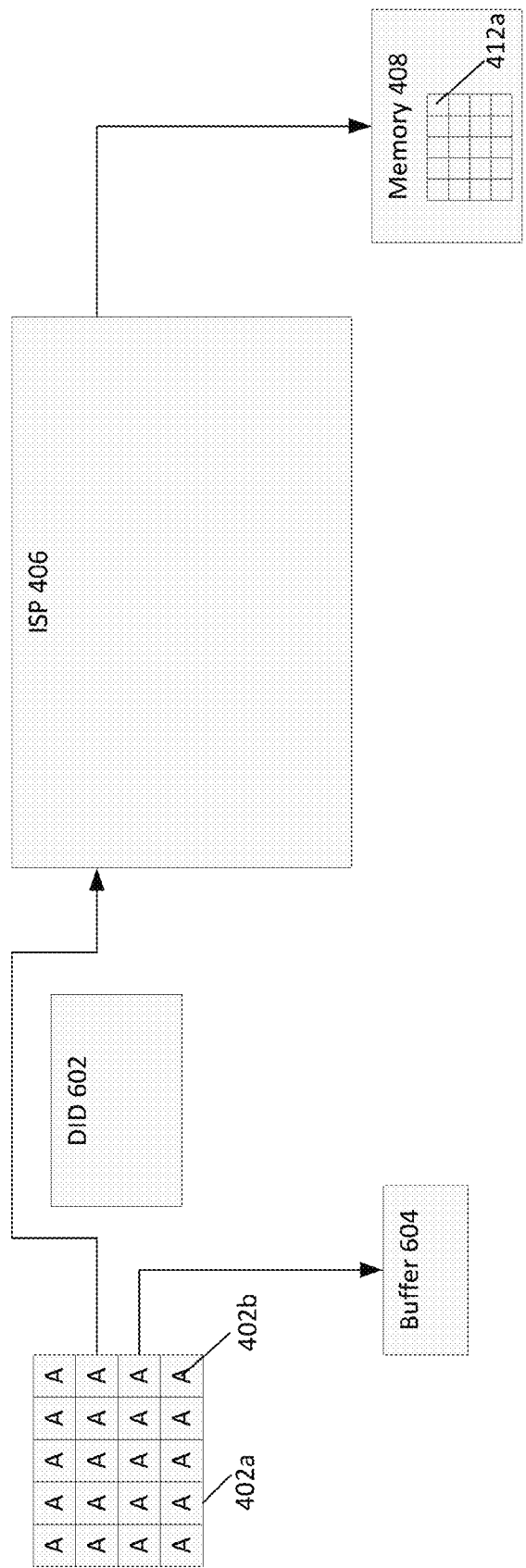
FIGS. 6A and 6B illustrate example block diagrams of a system where a DID is used in conjunction with an ISP.
Figure 6B:
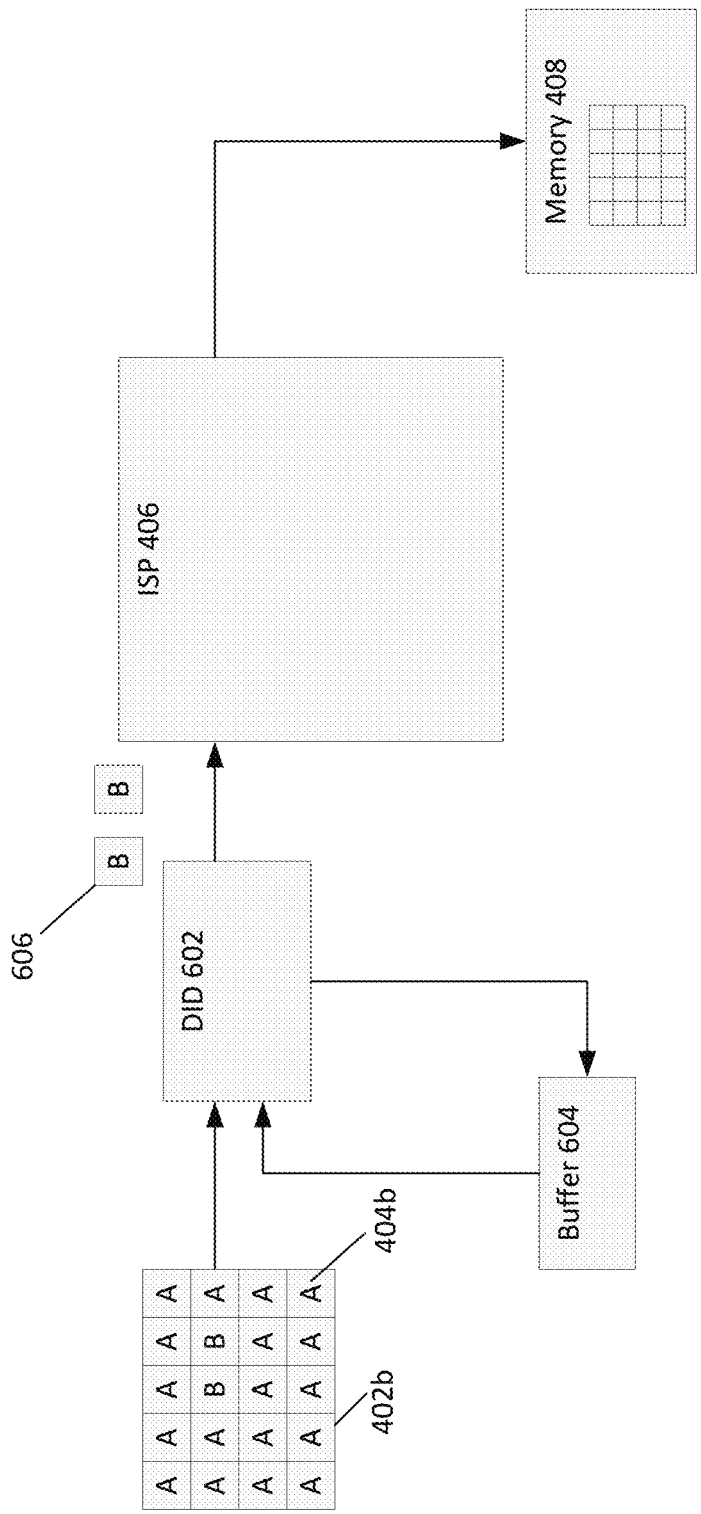

FIGS. 6A and 6B illustrate block diagrams of a system where a DID used in conjunction with an ISP, in accordance with some embodiments. The DID 602 and buffer 604 may be used to determine which tiles of a received image frame will be processed by the ISP 406. During operation, the buffer 604 may be used to store tile data associated with a previously processed image frame. As new image frame data is received for processing, the DID 602 compares the tiles of the received image frame with the stored tiles of the previously processed image frame, in order to determine which tiles need to be processed by the ISP 406, and which tiles do not need to be processed by the ISP 406. In some embodiments, the DID 602 may be implemented as part of the processor 205 and/or DID IC 216 as illustrated in FIG. 2, while the buffer 604 may be implemented as part of the storage 275.

FIG. 6A illustrates a block diagram of the system when a first image frame 402a (comprising a plurality of tiles 404a) is received. Because no image frames having already been processed, buffer 404 may be empty and contains no previously processed image frame data. As such, the first image frame 402a is stored in buffer 604. In addition, because the DID 602 does not have access to any previously processed image frame data to compare the tiles of the received image frame to, the DID 602 may be bypassed, and all tiles 404a of the received image frame 402a are processed by the ISP 406 to produce processed image tiles 412a to be stored in the memory 408.

In the illustrated figure, the tiles 404a of the received image frame 402a are labelled "A" to indicate that they are from the first image frame. In various embodiments, the tiles of the image frame may be the same as each other, different from each other, or some combination thereof.

FIG. 6B illustrates a block diagram of the system when a subsequent image frame is received. The DID 602 receives the received image frame 402b, and compares the tiles 404b of the received image frame 402b to those of a previously received image frame (e.g., image frame 402a, as illustrated in FIG. 4A) stored in buffer 604, in order to determine which tiles of the received image frame are identical or substantially similar to the corresponding tiles of the previously received image frame, and which are different (hereinafter referred to as "delta tiles"). For example, in the illustrated embodiment, the identified delta tiles 606 comprise two tiles (e.g., tiles "B") that are different from the corresponding tiles of the previously processed image frame 402a, while the remaining tiles of the received image frame 402b are identical or substantially similar to the corresponding tiles of the previously processed image frame. As such, only the two delta tiles 606 may need to be processed by the ISP 406.

In some embodiments, the comparison between the received image tiles 404b and the corresponding tiles 404a of the previously received image frame may be performed based upon a tile threshold value indicating a dissimilarity level, wherein if the dissimilarity between the received image tile and the corresponding previous tile meets the tile threshold value, the tiles will be considered delta tiles.

The ISP 406 processes the delta tiles 606 of the received image frame to be stored in the memory 408. In some embodiments, the memory 408 may reconstruct and store a processed image frame for the received image frame, by updating the tiles of the previously processed image frame using the received processed delta tiles. In other embodiments, in order to reduce the amount of memory required, the memory may store only the delta tiles of the received image frame, and reconstruct the processed image frame for the received image frame on the fly as needed.

In addition, the identified delta tiles 606 may be received and stored by the buffer 604. The buffer 604 may use the received delta tiles 606 to construct the received image frame (e.g., by updating the stored previously received image frame using the delta tiles), so that the received image frame can be used for comparison against a subsequently received image frame. In some embodiments, the entire received image frame 402b may be stored in the buffer 604. This may be done to insure that buffer 604 remains up-to-date with the latest received image frame, as in some embodiments, image tiles that are not delta tiles may still be slightly different between image frames.

The DID 602 may be associated with a plurality of different threshold values. As discussed above, "tile threshold," as used herein, may refer to a dissimilarity level between compared image tiles. For example, a received image tile may be designated a delta tile of a dissimilarity level between the image tile and a corresponding previously received image tile (e.g., retrieved from buffer 604) exceeds the tile threshold.

"Frame threshold," as used herein, may indicate a number of image tiles of a received image frame that have been designated delta tiles. In some embodiments, the DID 602 may compare image tiles of a received image frame against corresponding image tiles of a previously received image frame in a sequential manner. As such, the frame threshold for a received image frame may be reached before the DID 612 has compared all image tiles of the image frame.

"Differential processing bypass threshold," as used herein, may indicate a number of received image frames meeting the frame threshold. In some embodiments, a differential processing bypass threshold may indicate a number of consecutive image frames that meet the frame threshold. Both frame thresholds, and differential processing bypass thresholds will be discussed in greater detail below.

Figure 7:
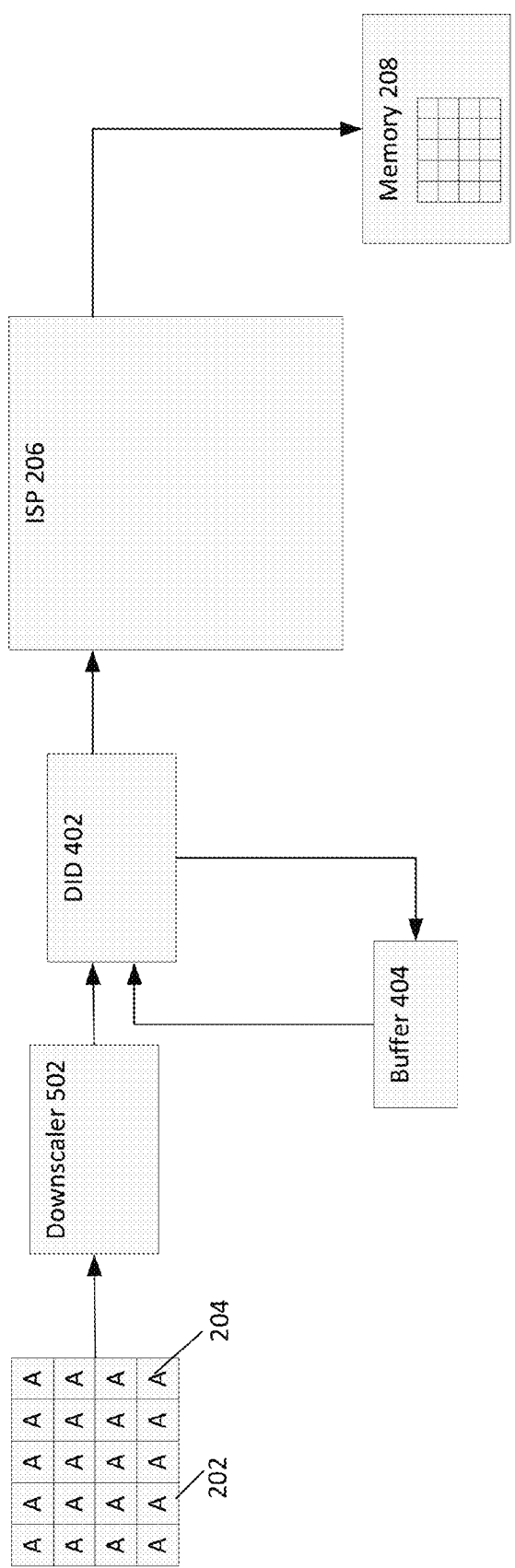
FIG. 7 illustrates a block diagram of a system where downscaling is implemented.

In some embodiments, in order to reduce the storage space needed for buffer 404 and the processing needed to be performed by DID 602, received raw image frame data may be downscaled. For example, FIG. 7 illustrates a block diagram of a system where downscaling is implemented. The received image frame 402 may be downscaled at the downscaler 702, and compared by the DID 602 against a downscaled version of the previously received frame retrieved from the buffer 604. In addition, one or more delta tiles of the downscaled received image frame are used to update the buffer. When a tile is identified as a delta tile, the original non-scaled version of the tile may be passed to the ISP 406 for processing.

In some embodiments, in order to reduce an amount of processing and memory access associated with the buffer 604, the buffer 604 may be configured to store an indication of the image tiles (e.g., downscaled image tiles, signatures identifying image tiles, and/or the like) of the frame, instead of actual image tiles of an image frame. For example, in some embodiments, image tiles of a received image frames may be processed to produce signatures corresponding to the image tiles, which can be compared with corresponding image tile signatures retrieved from the buffer, in order to determine if the image tiles should be designated as delta tiles or not.

Figure 8:
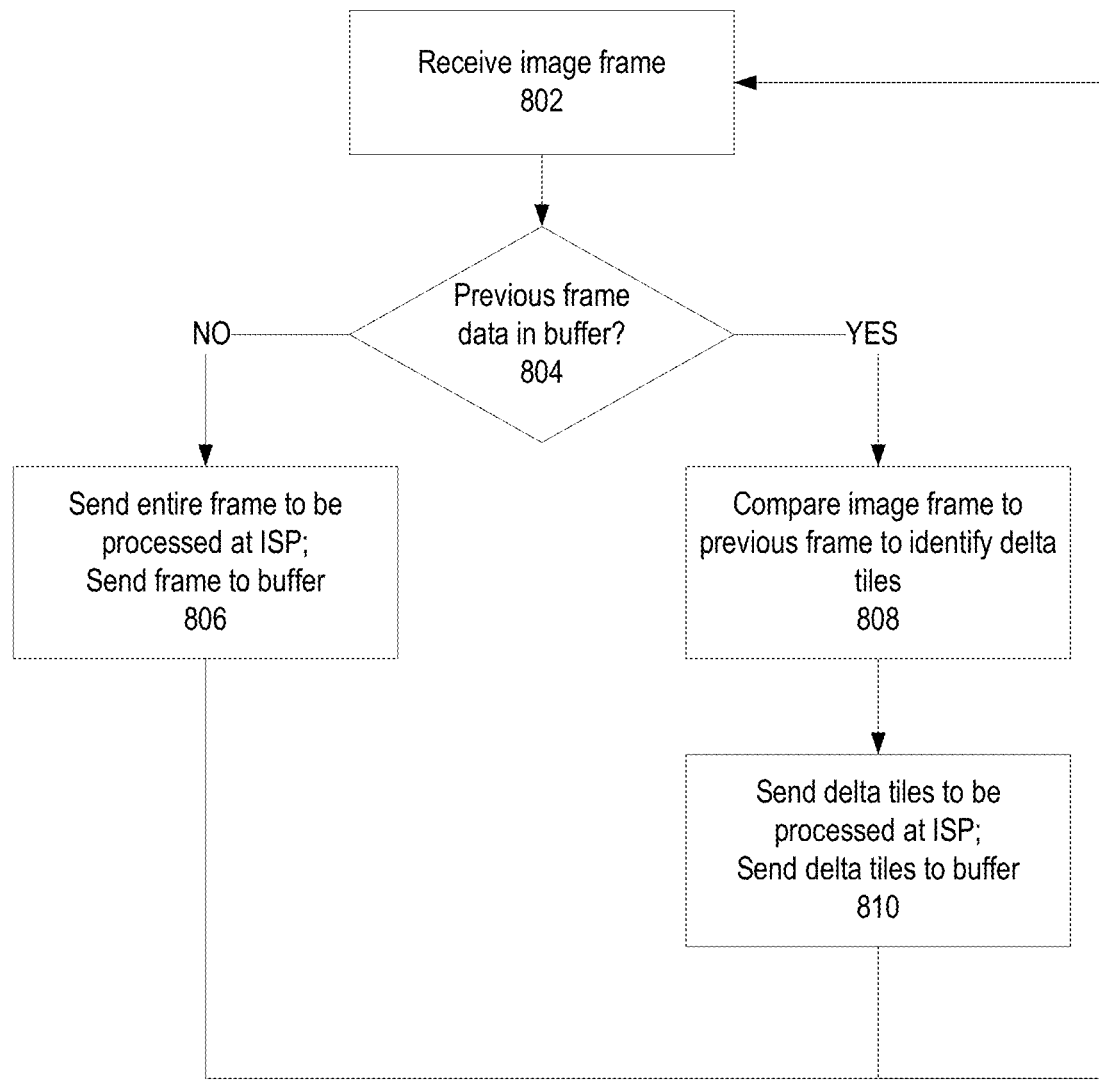
FIG. 8 illustrated a flowchart of a process for differential processing of received image frames, in accordance with some embodiments.

FIG. 8 illustrates a flowchart of a process for differential processing of received image frames, in accordance with some embodiments. The process may be performed by the DID or component(s) thereof. At block 802, an image frame is received. For example, the image frame may comprise an image received at a digital camera or other image capture device. At block 804, a determination is made as to whether there exists data for a previously received frame in a buffer. In some embodiments, a buffer can be used to store a previously received frame, such that differential processing can be used to process the received image frame. In some embodiments, the buffer may store a downscaled version of the previously received frame, or some other indication of the previously received image frame (e.g., signatures corresponding to the tiles of the previously received image frame).

In some embodiments, the buffer may not contain previously received image frame data. For example, the currently received image frame may be the first received image frame (e.g., the camera was just turned on). At block 806, if it is determined that the buffer does not contain data associated with the previously received image frame, the received image frame may be passed to the ISP to be processed in its entirety. In addition, the received image frame may also be used to update the buffer, for use in differential processing of subsequent image frames. The process may then return to block 802, where a subsequent image frame is received.

On the other hand, if it is determined that the buffer does contain previous image frame data, the process may proceed to block 808, where the received image frame is compared to the previous image frame to identify one or more delta tiles. In some embodiments, the comparison comprises comparing each tile of the received image frame with a corresponding tile of the previously received image frame.

In some embodiments, a tile from the received image frame may be considered to be identical or substantially similar to a corresponding tile of the previously received image frame if a dissimilarity between the tiles does not exceed a tile threshold value. The similarity may be calculated by comparing the pixels of each pair of tiles (e.g., the luma and chroma values of the pixels, DC (data chain) statistics, hexagonal statistics). Tiles of the received image frame whose dissimilarity to the corresponding tile of the previously received image exceeds the tile threshold value may be designated as delta tiles.

At block 810, once the delta tiles have been identified, the delta tiles may sent to the ISP for processing. In addition, the identified delta tiles may be used to update the buffer, such that the buffer reflects the received image frame, which may be used for differential processing of a subsequent image frame. The process may then return to block 802, where a subsequent image frame may be received.

In some embodiments, the differential processing may be utilized only in certain conditions. Because comparing tiles of received image frames with corresponding tiles of previously received image frames at the DID consumes processing power, it may be beneficial to only perform differential processing when the benefit (e.g., decrease in processing power consumed due to the ISP not processing all received image tiles) outweighs the cost (e.g., processing power consumed from comparing received image tiles with previously received image tiles). In situations where image frames change rapidly and there are a large number of delta tiles per frame, it may not be worth it to implement differential processing, as the number of tiles not processed by the ISP (due to being identical or substantially similar to a corresponding tile of the previous image frame) may be too small to realize savings in processing and power consumption to counteract the additional processing and power consumption cost associated with comparing the received image frames at the DID.

In some embodiments, a frame threshold may be set signifying a maximum number of delta tiles that may be detected in a received image frame before the remainder of the image frame is processed by the ISP in its entirety (e.g., by turning off or bypassing the DID). In some embodiments, the frame threshold may be based upon a number of tiles per image frame (e.g., the frame threshold may be set at 20% of the total tiles in each image frame). For example, in an embodiment where each image frame has an image resolution of 12 MP, RAW 10 Bit, a height and width of 3000 pixels by 4000 pixels, frame rate of 30 FPS, and tile size of 50 by 50 pixels (resulting in 4800 tiles per image frame), the frame threshold may be set at 20% (e.g., 960 tiles).

Figure 9:
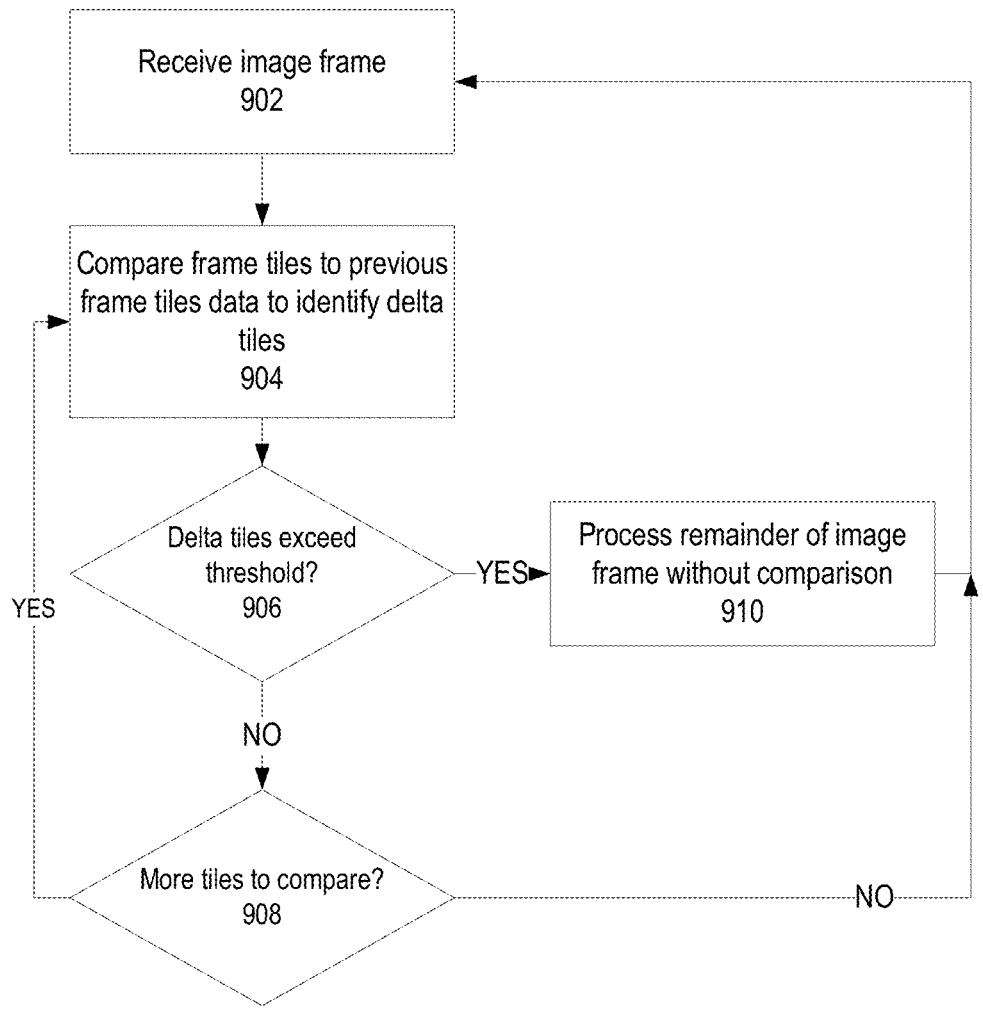
FIG. 9 illustrates a flow chart of a process for determining when to bypass the DID for at least a portion of an image frame.

FIG. 9 illustrates a flow chart of a process for determining when to bypass the DID for at least a portion of an image frame. At block 902, an image frame is received. At block 904, the tiles of the received image frame are compared to corresponding previous image frame tiles to identify delta tiles (e.g., as described in FIG. 8).

At block 906, a determination is made as to whether the number of identified delta tiles has exceeded a threshold value (e.g., the frame threshold). If not, then at block 908, a determination is made as to whether there are additional tiles in the image frame to compare. If so, the process may return to block 904, where additional tiles of the received image frame are compared to corresponding previous image frame tile data to determine of the tiles are delta tiles. If not, then the process may return to block 902, where a subsequent image frame is received.

However, if the number of delta tiles has exceeded the frame threshold, then at block 910, the remainder of the image frame may be processed by the ISP without performing further comparison on the remaining tiles of the image frame. In some embodiments, this may be done in order to save power, e.g., by not having the DID consume additional power comparing the remaining received image tiles of the frame, when it is predicted that enough of the remaining tiles will be delta tiles that will be processed by the ISP (e.g., due to the frame threshold being met) such that any power savings that may be realized by not processing remaining non-delta tiles in the image frame would be outweighed by the additional processing performed by the DID to identify the non-delta tiles.

In some embodiments, the remaining tiles may also be used to update the buffer, even if they are not compared at the DID, in order to ensure that the buffer accurately reflects the previously received image frame as additional image frames are received. The process may then return to block 902, where a subsequent image frame is received.

In some embodiments, differential processing may be bypassed entirely if it is determined that the received image frames are too different from each other to realize any savings in processing resources or memory usage. In some embodiments, this may be done by tracking a number of received image frames that meet or exceed the frame threshold. For example, in some embodiments, if a number of consecutively received image frames that meet or exceed the frame threshold reaches a threshold value (also referred to as a "DID bypass threshold" or "shutdown threshold"), differential processing may be automatically bypassed for all subsequently received frames (e.g., received and processed by the ISP in their entireties). In other embodiments, differential processing may be bypassed when the amount of received image frames meeting or exceeding the frame threshold reaches a threshold amount (e.g., 80% of the received frames out of at least 1000 received frames).

In some embodiments, after differential processing has been bypassed, it may be re-enabled at a later time. For example, in some embodiments, differential processing may be re-enabled based upon a counter (e.g., a software counter) that determines a period (e.g., a time period or a designated number of frames) that differential processing is bypassed. In some embodiments, differential processing may be re-enabled based upon one or more feedback mechanisms. For example, the ISP may feedback statistics during operation, whereupon differential processing may be re-enabled after a certain threshold number of frames based upon the collected statistics. These statistics may comprise luma/chroma statistics of processed image data, motion compensation blocks associated with the image data, one or more counters tracking a number of mismatched frames or tiles, and/or the like. In some embodiments, a third-party sensor may be used to determine when to re-enable differential processing (e.g., by tracking one or more statistics).

For example, in some embodiments, a counter may be associated with the ISP. As the ISP processes received image frames, the ISP may calculate motion statistics based on the processed image frames which may indicate a level of similarity between consecutively processed image frames. The counter may be incremented in response to the calculated motion statistics indicating a similarity between image frames (e.g., meeting a similarity level). For example, in some embodiments, the counter may track a number image frames found to be similar to a previous image frame based upon the motion statistics. In other embodiments, the counter may track a number of consecutive image frames found to be similar to a previous image frame. When the counter reaches a predefined counter threshold, DID processing may be re-enabled.

In some embodiments, a counter may be associated with a third-party sensor instead of or in addition to the ISP. In some embodiments, whether processed image frames are similar to a previously processed image frame may be determined using other types of statistics.

Figure 10:
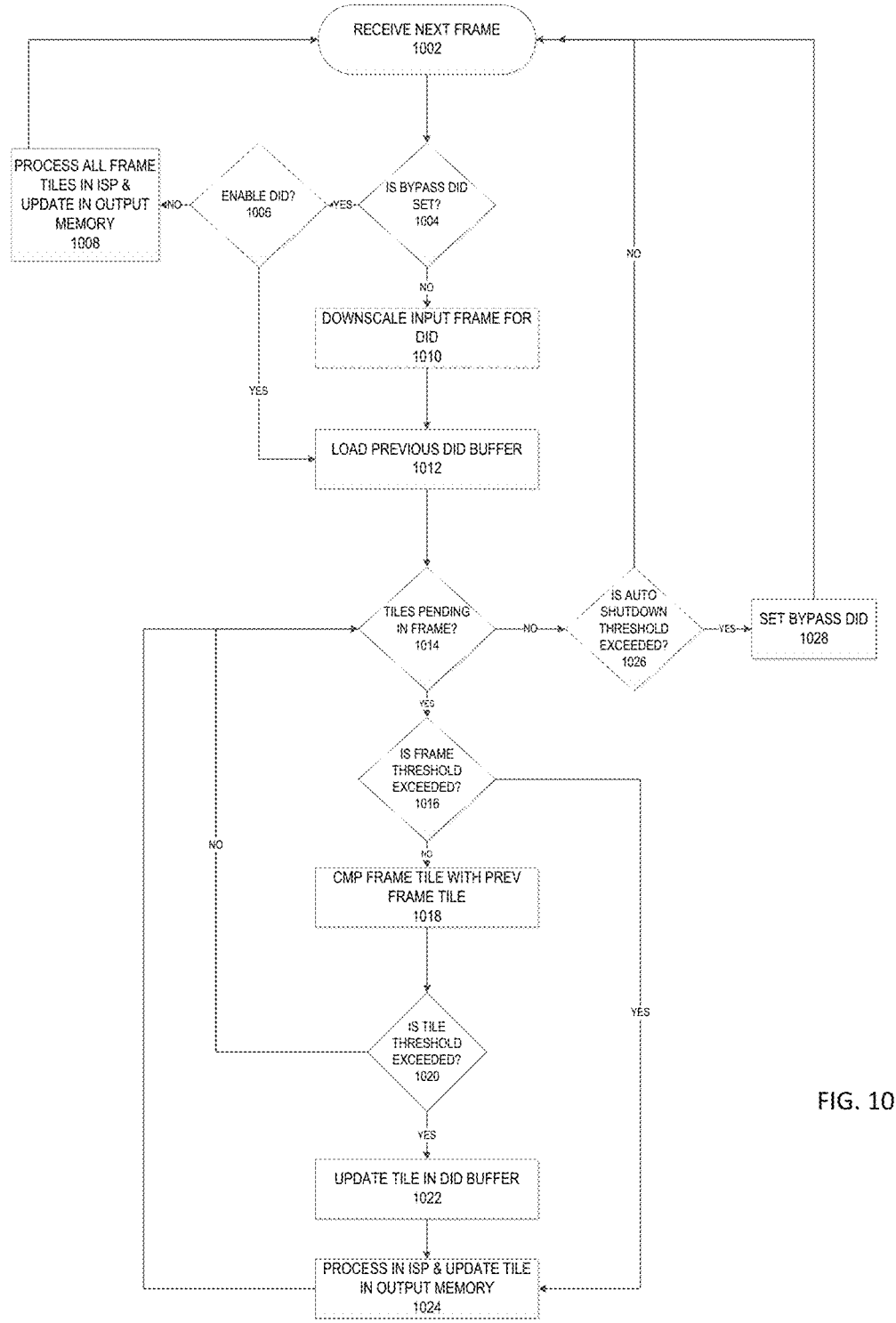
FIG. 10 illustrates a flowchart of process for operating, bypassing, and re-enabling differential processing.

FIG. 10 illustrates a flowchart of process for operating, bypassing, and re-enabling differential processing, in accordance with some embodiments. At block 1002, an image frame is received. At block 1004, a determination is made as to whether differential processing is enabled, or set to be bypassed.

If differential processing is set to be bypassed, the process may proceed to block 1006, where an optional determination is made as whether differential processing is to be enabled. In some embodiments, one or more criteria or conditions for re-enabling differential processing may be defined in software or firmware of the system. For example, in some embodiments, differential processing may be re-enabled after a set amount of time, based upon one or more feedback mechanisms (e.g., feedback from the ISP, or a third-party sensor, and/or like), based upon a counter tracking a number of similar image frames or consecutive similar image frames (e.g., based upon one or more statistics received from the ISP or a third-party sensor, such as motion statistics), or some combination thereof. If it is determined that differential processing is not to be re-enabled, the process proceeds to block 1008, where the received image frame is processed in its entirety by the ISP and stored in memory. The process may then return to block 1002, where a subsequent image frame may be received.

On the other hand, if differential processing is enabled, the process may, at block 1010, optionally downscale the received image frame for the purpose of comparison at a DID. At block 1012, a previously received frame stored in a buffer may be retrieved.

At block 1014, a determination is made as to whether there are any tiles pending in the currently received image frame. Pending tiles may refer to tiles that have not yet been compared to their corresponding previously received tiles during differential processing. If there are remaining pending tiles in the image frame, then at block 1016, a determination may be made as to whether a frame threshold for the image frame has been exceeded. As discussed above, the frame threshold may indicate a threshold number of delta tiles that can be identified for a particular image frame before differential processing is bypassed for the remaining tiles of the image frame. If the frame threshold has been exceeded for the image frame, then at block 1024 the tile is not compared as part of differential processing and passed to the ISP for processing and storage in memory. The process may then return to block 1014 to receive the next pending tile in the image frame (if any). Because the frame threshold has been exceeded, the subsequent bending tiles of the image frame will also bypass differential processing and be passed to the ISP for processing. In some embodiments, these tiles may also be used to update the buffer, in order to ensure that the buffer accurately reflects the previously received image frame.

On the other hand, if the frame threshold has not been exceeded, the tile is compared to a corresponding frame tile loaded from the buffer at block 1018. At block 1020, a determination is made, based upon the comparison, whether the tile threshold has been exceeded, wherein the tile threshold indicates a difference between the image frame tile and the corresponding previous tile, such that the tile is considered a delta tile if the tile threshold is exceeded. If the tile threshold is not exceeded (indicating the tile is identical or substantially similar to the corresponding previous tile), the tile is not processed by the ISP, and the process may return to block 1014 to receive the next pending tile in the image frame (if any).

On the other hand, if the tile threshold is exceeded (indicating that the tile is a delta tile), then, at block 1022, the tile may be used to update the buffer. In some embodiments, the buffer is updated regardless of whether the tile is a delta tile or not. This may be done in order to ensure that the buffer always accurately reflects the tiles of the previously received image frame, due to the fact that in some embodiments tiles may be bypassed from ISP processing even though they are not identical to the corresponding previous tile. At block 1024, the delta tile is processed by the ISP and stored into memory, and the process may return to block 1014 to receive the next pending tile in the image frame (if any).

Once there are no more pending tiles in the image frame ("no" branch of block 1014), the process may proceed to block 1026, where a determination may optionally be made as to whether a differential processing bypass threshold has been exceeded. In some embodiments, the differential processing bypass threshold may be defined in software or firmware of the system. In some embodiments, the differential processing bypass threshold may be based upon a number of image frames where the frame threshold has been exceeded. For example, the differential processing bypass threshold may indicate a number of consecutive image frames that exceeded the frame threshold. In some embodiment, a number of frames or number of consecutive frames that have exceeded the frame threshold may be tracked using a counter. If the differential processing bypass threshold is exceeded, differential processing may be set to be bypassed (block 1028). The process may then return to block 1002, where a subsequent image frame is received.

As described above, differential processing may be enable or disabled (bypassed) automatically on the fly during operation, depending upon the amount of change between consecutively received image frames. For example, differential processing may be enabled when there is little or gradual change between image frames (e.g., minor movement, time lapse photograph, etc.), while disabled when images are being captured of fast movement or when the camera is moving. By enabling and disabling differential processing, power savings and reduced memory usage may be realized.

Figure 11:
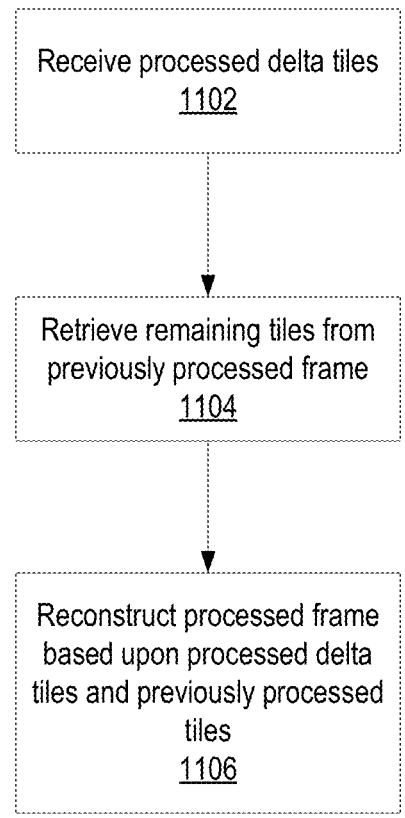
FIG. 11 illustrates a flowchart of a process for constructing a processed image frame.

When differential processing is implemented, because the ISP does not process all tiles of the received image frames, the processed image frame may need to be reconstructed based upon a combination of processed tiles for the image frame and processed tiles from previous image frames. FIG. 11 illustrates a flowchart of a process for constructing an image frame, in accordance with some embodiments. At block 1102, processed tiles from an image frame are received. The processed tiles may correspond to delta tiles. In some embodiments, if differential processing is bypassed for a portion of the image frame (e.g., due to the frame threshold being exceeded), the received processed tiles may also include non-delta tiles.

At block 1104, processed tiles from previously received image frames are retrieved. In some embodiments, the processed tiles may be from multiple different image frames. For example, for the embodiment illustrated in FIG. 5, when reconstructing frame 500c, delta tiles may be received corresponding to person 502's left arm (block 1102), due to the left arm moving between frames 500c and 500b. In addition, processed tiles associated with the person 502's right arm associated with frame 500b may be received, as well as processed tiles associated with other regions of the frame associated with frame 500a.

At block 1106, the received tiles from the current image frame and those retrieved from previously processed image frames are combined to form a reconstruction of the current image frame.

One or more of the components, steps, features and/or functions illustrated in the figures may be rearranged and/or combined into a single component, step, feature or function or embodied in several components, steps, or functions. Additional elements, components, steps, and/or functions may also be added without departing from novel features disclosed herein. The apparatus, devices, and/or components illustrated in the figures may be configured to perform one or more of the methods, features, or steps described in the figures. The novel algorithms described herein may also be efficiently implemented in software and/or embedded in hardware.

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be rearranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, storage medium may represent one or more devices for storing data, including read-only memory (ROM), random access memory (RAM), magnetic disk storage mediums, optical storage mediums, flash memory devices and/or other machine-readable mediums, processor-readable mediums, and/or computer-readable mediums for storing information. The terms "machine-readable medium", "computer-readable medium", and/or "processor-readable medium" may include, but are not limited to non-transitory mediums such as portable or fixed storage devices, optical storage devices, and various other mediums capable of storing, containing or carrying instruction(s) and/or data. Thus, the various methods described herein may be fully or partially implemented by instructions and/or data that may be stored in a "machine-readable medium," "computer-readable medium," and/or "processor-readable medium" and executed by one or more processors, machines and/or devices.

Furthermore, embodiments may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The various illustrative logical blocks, modules, circuits, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

A person having ordinary skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features of the invention described herein can be implemented in different systems without departing from the invention. It should be noted that the foregoing embodiments are merely examples and are not to be construed as limiting the invention. The description of the embodiments is intended to be illustrative, and not to limit the scope of the claims. As such, the present teachings can be readily applied to other types of apparatuses and many alternatives, modifications, and variations will be apparent to those skilled in the art.

What is claimed is:

1. A method operable by an image processing device, the method comprising:
   storing a previously received image frame in a buffer of the device, the previously received image frame comprising a first plurality of image tiles;
   receiving a second image frame comprising a second plurality of image tiles;
   determining which tiles of the second plurality are to be processed by an image signal processor (ISP) based on:
     identifying a first image tile of the first plurality that corresponds to a second image tile of the second plurality;
     comparing the first image tile and the second image tile; and
     determining a dissimilarity value between the first image tile and the second image tile based on the comparison of the first image tile and the second image tile;
     in response to a determination that the dissimilarity value between the first image tile and the second image tile is equal to or greater than a threshold, designating the second image tile as a delta tile to be processed by the ISP; and
   in response to a determination that a number of tiles of the second plurality designated as delta tiles is greater than or equal to a frame threshold, designating tiles of the second plurality that have not been compared to be processed by the ISP.

2. The method of claim 1, further comprising, in response to a determination that a number of received image frames meeting the frame threshold meets a differential processing bypass threshold value, designating all tiles of subsequent received image frames are designated to be processed by the ISP.

3. The method of claim 2, wherein the bypass threshold value indicates a number of consecutively received image frames meeting the frame threshold.

4. The method of claim 1, further comprising:
   receiving one or more feedback statistics from the ISP; and
   determining which tiles of the second plurality are to be processed by an ISP based at least in part upon the one or more received feedback statistics from the ISP.

5. The method of claim 4, wherein the one or more feedback statistics comprise at least one or more motion statistics, wherein the one or more motion statistics are used to determine a similarity level between a processed image frame and a previously processed image frame.

6. The method of claim 1, further comprising:
   receiving one or more feedback statistics from one or more third-party sensors;
   determining which tiles of the second plurality are to be processed by an ISP based at least in part upon the one or more received feedback statistics from the one or more third-party sensors.

7. The method of claim 1, further comprising downscaling the second image frame.

8. The method of claim 1, further comprising updating the buffer using the designated delta tiles.

9. The method of claim 1, wherein the frame threshold is based at least in part upon a number of image tiles of the second image frame.

10. The method of claim 1, wherein the differential processing bypass threshold value indicates a number of consecutively received image frames meeting the frame threshold value.

11. An image processing device, comprising:
    a buffer storing a previously received image frame in a buffer of the device, the previously received image frame corresponding comprising a first plurality of image tiles;
    a processor configured to:
      receive a second image frame, the second image frame comprising a second plurality of image tiles;
      determineing which tiles of the second plurality are to be processed by an image signal processor (ISP), based on:
        identifying a first image tile of the first plurality that corresponds to a second image tile of the second plurality;
        comparing the first image tile and the second image tile; and
        determine a dissimilarity value between the first image tile and the second image tile based on the comparison of the first image tile and the second image tile;
        in response to a determination that the dissimilarity value between the first image tile and the second image tile is equal to or greater than a threshold, designating the second image tile as a delta tile to be processed by the ISP; and in response to a determination that a number of tiles of the second plurality of designated as delta tiles is greater than or equal to a frame threshold designating tiles of the second plurality that have not been compared to be processed by the ISP.

12. The image processing device of claim 11, wherein the processor is further configured to, in response to a determination that a number of received image frames meeting the frame threshold meets a differential processing bypass threshold value, designating all tiles of subsequent received image frames to be processed by the ISP.

13. The image processing device of claim 12, wherein the bypass threshold value indicates a number of consecutively received image frames meeting the frame threshold.

14. The image processing device of claim 11, wherein the processor is further configured to:
receive one or more feedback statistics from the ISP; and
determine which tiles of the second plurality are to be processed by an ISP based at least in part upon the one or more received feedback statistics from the ISP.

15. The image processing device of claim 14, wherein the one or more feedback statistics comprise at least one or more motion statistics, wherein the one or more motion statistics are used to determine a similarity level between a processed image frame and a previously processed image frame.

16. The image processing device of claim 11, wherein the processor is further configured to:
receive one or more feedback statistics from one or more third-party sensors;
determine which tiles of the second plurality are to be processed by an ISP based at least in part upon the one or more received feedback statistics from the one or more third-party sensors.

17. The image processing device of claim 11, further wherein the processor is further configured to downscale the second image frame.

18. The image processing device of claim 11, wherein the processor is further configured to update the buffer using the designated delta tiles.

19. The image processing device of claim 11, wherein the frame threshold is based at least in part upon a number of image tiles of the second image frame.

20. The image processing device of claim 12, wherein the differential processing bypass threshold value indicates a number of consecutively received image frames meeting the frame threshold value.

* * * * *